Patented Oct. 31, 1950

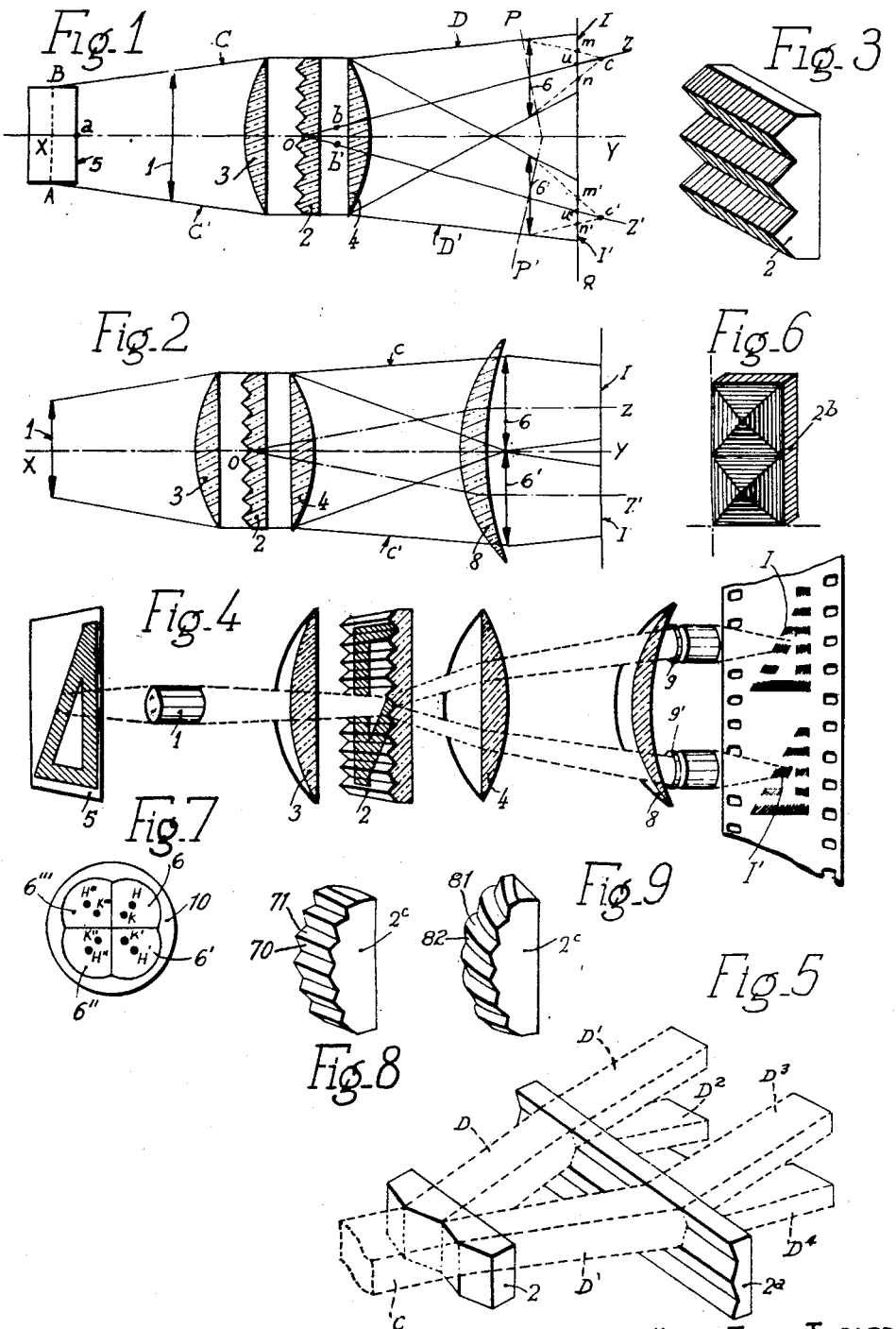

2,527,896

UNITED STATES PATENT OFFICE 2,527,896

OPTICAL IMAGE SEPARATING DEVICE WITH PLURAL PRISM FOR DIVIDING THE LIGHT BEAM FOR COLORED PHOTOGRAPHY AND CINEMATOGRAPHY

Armand Henri Julien Thirard and Jean Roger Dicop, Colombes, France

Application May 20, 1946, Serial No. 671,058
In France January 8, 1945

Section 1, Public Law 690, August 8, 1946
Patent expires January 8, 1965

8 Claims. (Cl. 88—1)

This invention relates to optical devices of the kind adapted to obtain several distinct similar images of an object and which are intended to be used particularly in coloured photography and kinematography by additive or subtractive synthesis.

The novel device comprises a beam splitting and imaging system substantially located in the image plane of a primary objective and which divides the single beam of incident rays into several convergent beams having divergent optical axes and all having the same colouration that said single beam and emanating from the totality of the field of view of said objective, said convergent beam being directed on to secondary objectives respectively located in the conjugate image planes of the primary objective with respect to said beam splitting and imaging system, said secondary objectives being intended to form in their image planes images exactly similar to each other.

It is to be understood that "beam splitting and imaging systems" is intended to design an optical system assuming the double function of forming, from the incident beam, several emerging beams with different optical axes and having the same colouration that said incident beam (for instance, a system of small prisms) and of giving images of the primary objective, either by combination of prisms and lenses associated thereto or by inclination and suitable shaping of the faces of the prisms used singly.

Further characteristics of the invention will be set forth by the following description:

In the accompanying drawings which are given only by way of example,

Fig. 1 represents a diagrammatic view of an embodiment of the invention;

Fig. 2 is a similar view with collimating lens in front of the secondary objectives;

Fig. 3 is a detail view of the analyzing prism arranged according to Figs. 1 and 2.

Fig. 4 is a diagrammatic perspective view showing an arrangement of colour filters;

Fig. 5 shows the utilization of two analyzing prisms disposed at right angle for obtaining four secondary images.

Fig. 6 represents a pyramidal deflecting device.

Fig. 7 shows an embodiment of the secondary devices in the case of four beams of light.

Figs. 8 and 9 are perspective views of a beam splitting and imaging device consisting of a system of prisms with suitably inclined and formed faces.

In accordance with the embodiment of the invention diagrammatically illustrated in Fig. 1, the device comprises a primary objective I with an axis XY combined with a beam splitting and imaging device.

Said device comprises a system of small prisms 2 the faces of which are alternatively parallel and two lenses 3 and 4 disposed on either side of the system 2. The whole system (2, 3, 4) is such that on the one hand it will give from an incident beam such as C issued from an object 5, falling on the lens 3 and covering all of said lens, two emerging convergent beams such as D, D' having the same colouration as the incident beam but with different optical axes OZ and OZ' both emanating from the totality of the filed of the objective I.

On the other hand said arrangement (2, 3, 4) will give two images of the primary objective I in two planes P and P' symmetrical relatively to XY.

Two secondary objectives 6, 6' are placed at the intersection of said planes P, P' with the optical axes OZ and OZ'. Said objectives are dimensioned and positioned so that the optical axes OZ and OZ' of the two emergent beams DD' respectively pass through the geometrical center of each of said objectives 6, 6' and thus they will be traversed by the totality of the luminous flux of the corresponding emerging convergent beam D or D'.

Under these conditions and by means of suitable adjustment of the objective I, a single spatial image of the object 5 is formed along the optical axis within or in the vicinity of the system 2. The objectives 6 and 6' then form, from said single image in volume, two images I and I' along the two secondary axes OZ and OZ' in a plane Q for instance of a photographic film and located in the rear of the planes P and P'.

Both images are strictly identical not only for the plane AB of the object 5 the focussing thereof is rigorous, but also for all other points situated in the field of objective I the images of such points being formed behind or before the plane Q.

Consider a point $a$ on the axis XY, for instance, in front of the plane AB of the object 5 upon which the focusing has been effected, due to the device (2, 3, 4), the primary objective I will furnish two images $b$ and $b'$ thereof in the vicinity of system 2 on the axes OZ and OZ'.

According to the invention, a device may be provided such as a collimating lens 8 (Fig. 2) having its focus at O or prisms with suitable slope in such manner as to restore the parallelism between the optical axes.

If it is desired to make use of the secondary images for coloured photography, kinematography or television by additive or subtractive synthesis, coloured filters or similar elements 9, 9' (Fig. 4) will be placed on the path of the emergent beams and thus the monochromatic images I and I' will be obtained.

Naturally, a similar arrangement can be used for projection with the view of reconstituting the polychromatic image.

It is understood that a deflecting system furnishing a number of emergent beams greater than two may be utilized.

Four beams and consequently four secondary images may be obtained by setting between the two lenses 3 and 4 either two prismatic systems 2 and 2a (Figure 5) crossed and spaced one from the other, the system 2 producing two beams D and D' from the incident beam C and each of said beams D and D' being further split into two beams $D^1$ and $D^2$, and $D^3$ and $D^4$ by the second prismatic system 2a. Alternatively, a deflecting element such as is partially shown in Figure 6 may be employed, said element comprising protuberances derived by the intersection of prismatic surfaces which are alternately parallel, the protuberances being square pyramids.

Practically, as shown in Fig. 7, the secondary objectives may be constituted, for instance in the case of four beams, of portions of lenses 6, 6', 6", 6''' assembled in the same mount 10, provided that the optical axes OZ, OZ' of the convergent beams $D^1$, $D^2$, $D^3$, $D^4$ emerging from the image dividing focal system respectively pass through the geometrical centers H, H', H", H''' different from the optical centers K, K', K", K''' of said secondary objectives, and thus the latter be traversed by the totality of the luminous flux corresponding to each convergent beam $D^1$, $D^2$, $D^3$, $D^4$.

As has been stated previously, the beam splitting and imaging system can be materialized simply by means of a single element comprising at least, on one of its faces, small prisms the faces thereof being suitably inclined and formed so as to form a lens to enable it to give a convergent beam merely by itself. Thus, in Figs. 8 and 9 such a system intended for two images is shown, having a plurality of facets 70, 71 or 80, 81, displayed on a surface of revolution either with rectilinear (Fig. 8) or of curved generating-lines (Fig. 9).

Obviously, the invention is not in any way limited to the embodiments herein described and shown, which are given only by way of example.

In the case of a system of small prisms combined with lenses, one may provide either a single lens placed before or after the system, or several lenses conveniently distributed with respect to the system, as shown.

Eventually aspherical surfaces may be used.

The sizes and distribution of the elements may be such that the mosaic obtained be not or little visible upon the final image.

The secondary images are not necessarily situated in the same plane. Eventually, they may be formed upon distinct sensitive surfaces disposed in different planes, in which case the image may not be identical but merely similar.

Having now described our invention what we claim as new and desire to secure by Letters Patent is:

1. An optical image separating device for giving several identical images of an object without parallax effect, comprising in combination: a primary objective having an optical principal axis, a beam splitting device, the center of which is located on said axis substantially in the image plane of said primary objective, said latter device comprising an optical element provided on its front surface with a plurality of adjacent small prisms, the inclined faces of which are alternately parallel, for splitting the beam which emerges from said primary objective into a plurality of resultant beams with divergent optical axes, each of said resultant beams emerging from substantially the entire rear surface of said optical element, a positive lens system in optical alignment with said optical element and positioned substantially at the focal plane of the primary objective, the focal plane of said positive lens system intersecting each of said divergent optical axes and providing a convergent beam along each of said divergent axes, and respective secondary objectives having their optical centers on the respective divergent axes and spaced so as to lie substantially at the focal plane of said positive lens system and being substantially in the conjugate image plane of said lens system relative to the primary objective.

2. An optical image separating device as claimed in claim 1, wherein said lens system comprises two lenses positioned respectively on opposite sides of said optical element substantially in contact therewith.

3. An optical image separating device as claimed in claim 1, and wherein said lens system includes a lens and wherein the optical element is formed directly on one of the faces of the lens.

4. An optical image separating device as claimed in claim 1, and wherein said lens system includes a cylindrical lens and wherein said optical element is formed directly on one cylindrical face of the lens and wherein the prisms extend parallel to the axis of said cylindrical face.

5. An optical image separating device as claimed in claim 1, and wherein said optical element comprises a member on a face of which the adjacent small prisms are formed, the prisms being square pyramids.

6. An optical image separating device as claimed in claim 1, and wherein said optical element comprises a first member on a front face of which the adjacent small prisms are formed and an additional member on the surface of which additional adjacent small prisms are formed whose alternate faces are parallel, the parallel edges of the first prisms being crossed with respect to the parallel edges of said additional prisms.

7. An optical image separating device as claimed in claim 1, further comprising a collimating device positioned forwardly adjacent the secondary objectives.

8. An optical image separating device as claimed in claim 1, further comprising respective color filters, each disposed in the path of one of said convergent beams.

ARMAND HENRI JULIEN THIRARD.
JEAN ROGER DICOP.

REFERENCES CITED

The following references are of record in the file of this patent:

UNITED STATES PATENTS

| Number | Name | Date |
|---|---|---|
| 666,424 | Ives | Jan. 22, 1901 |
| 1,873,302 | Francisco | Aug. 23, 1932 |

FOREIGN PATENTS

| Number | Country | Date |
|---|---|---|
| 395 | Great Britain | Jan. 5, 1901 |
| 162,656 | Great Britain | Apr. 29, 1921 |
| 834,334 | France | Aug. 16, 1938 |